E. F. PAWSAT.
SECURING MEANS FOR TANDEM SEATS.
APPLICATION FILED SEPT. 8, 1915.
1,182,503.                              Patented May 9, 1916.
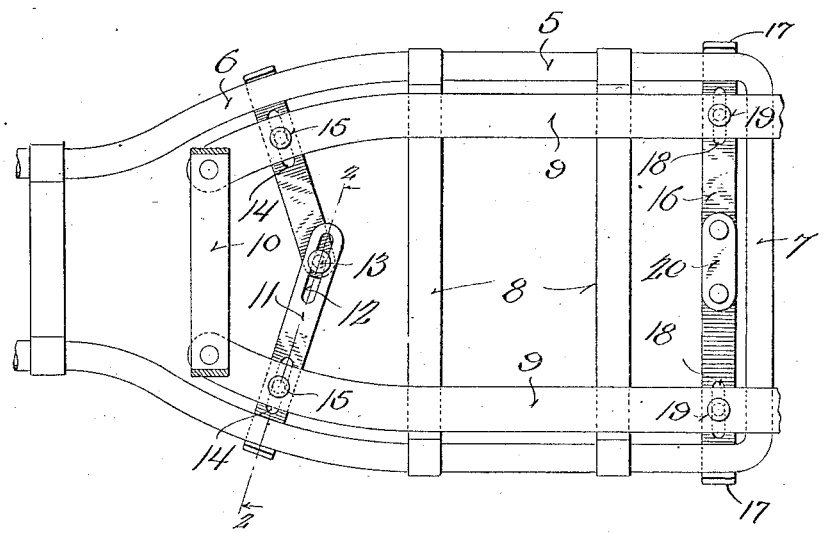
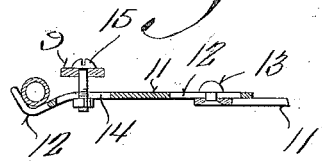
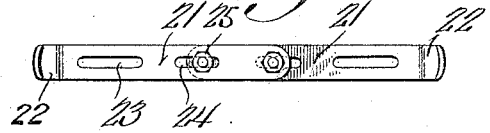

UNITED STATES PATENT OFFICE.

EWALD F. PAWSAT, OF SHEBOYGAN, WISCONSIN, ASSIGNOR TO WALD MANUFACTURING COMPANY, OF SHEBOYGAN, WISCONSIN.

SECURING MEANS FOR TANDEM SEATS.

1,182,503.

Specification of Letters Patent.

Patented May 9, 1916.

Application filed September 8, 1915. Serial No. 49,523.

*To all whom it may concern:*

Be it known that I, EWALD F. PAWSAT, a citizen of the United States, and resident of Sheboygan, in the county of Sheboygan and State of Wisconsin, have invented certain new and useful Improvements in Securing Means for Tandem Seats; and I do hereby declare that the following is a full, clear, and exact description thereof.

This invention relates to new and useful improvements in means for securing seat attachments to motorcycles, bicycles and the like, and is particularly adapted for securing tandem seats such as disclosed in my application for patent filed July 6, 1915, Serial No. 38210, although it may be also used in securing other types of seats such as those comprising a plain pad having a rigid base frame.

In applying tandem seats to motorcycle and bicycle structures, it is found that there is considerable variation in the relative sizes of the parts to which it is desired to attach the seat, and it is therefore an important object of the present invention to provide an attaching means which is adjustable in nature so as to adapt it for use under varying conditions, it being understood that the usual method of attachment for tandem seats is to secure them to the usual package carrier of the vehicle.

A further object is to provide such an attaching means which may be readily adjusted to adapt it for various widths of package carriers and which has its parts angularly adjustable for use in connection with package carriers which have portions of their frame bars angularly disposed.

With the above and other objects and advantages in view, the invention resides more particularly in the novel combination, arrangement and formation of parts more particularly hereinafter described and particularly pointed out in the appended claims.

Reference is had to the accompanying drawings wherein similar characters of reference designate corresponding parts throughout the several views and in which:

Figure 1 shows in conventional plan, the package carrier of a bicycle or motorcycle and positioned thereon the base portion of a tandem seat which is secured to the package carrier by the novel adjustable connecting means, the preferred type of the connecting means being shown as connecting the forward portion of the seat and a modified form of connecting means being shown as securing the rear portion of the seat; Fig. 2 is a sectional view taken through the preferred form on the line 2—2 of Fig. 1, and Fig. 3 is a plan view showing a still further modification of the device.

Referring now more particularly to the accompanying drawings, there is shown a conventional type of package carrier including the side bars 5 which have their forward ends converged at 6 and which are connected by the rear end bar 7 and a plurality of transverse supporting strips 8. A base portion of a tandem seat is positioned thereon and includes the side bars 9 seating on the strips 8 and bars 7 and connected at their forward ends by the bar 10, that portion of the seat-base which extends rearwardly of the package carrier being broken away.

The preferred form of attaching member which is particularly adapted for use in connection with the angularly inclined portions 6 of the package carrier comprises a pair of bars 11 which are so disposed with relation to the inclined portions 6 that they extend each at right angles to a respective portion 6 and have their outer ends lying under said portions, these outer ends being transversely bent to form channels 12 seating said portions 6. The inner end of one of the bars is provided with a longitudinal slot 12 and a loose rivet 13 is passed through the inner end of the other bar and through the slot to loosely secure the bars together. The intermediate portions of the bars are provided with longitudinal slots 14 and clamping bolts 15 are passed through these slots and through the seat-frame bars 9 to draw them down onto the transverse portions of the package carrier and to clamp the channels 12 against the side bars whereby the seat may be securely clamped in place. It is thus seen that the device is fully adjustable both with respect to the width apart of the side bars of the package carrier and with respect to the angular inclination of the portions 6 of said bars.

For attaching the rear portion of the seat-frame to the package carrier a slightly different form of the invention is employed, although all of the forms herein shown may be interchangeably employed as best suits certain conditions. This form of the device includes the bars 16 which have their outer ends bent to form transverse side bar seating channels 17 and which are provided with slots 18 similar to the slots 14 of the form of the device first described and receiving similar clamping bolts 19 which are passed through the seat-frame bars. The inner ends of these bars 16 are loosely connected by a pivoted link 20. This form of device is also adjustable as the bars 16 may be drawn inwardly by relatively swinging the link 20 and thus offsetting the bars with relation to each other, said bars also having relative angular movement to their connection.

Fig. 3 shows a form of the device wherein adjustment may only be had longitudinally and not angularly. In this form there are provided a pair of bars 21 carrying the usual transverse channels 22 at their outer ends, provided with the usual slots 23 in their intermediate portions for receiving clamping bolts. Each of these bars is provided adjacent its inner end with a longitudinal slot 24 and a bolt 25 which pass through the inner end of each bar and through the slot 24 of the other bar.

While these securing members are shown in connection with that type of tandem seat disclosed in my heretofore mentioned application, it is obvious that they may be employed in connection with any seat which has a sufficiently rigid base to properly hold the clamping bolts.

What is claimed is:

1. A securing device of the class described comprising a pair of bars having adjacent ends loosely connected and having their outer ends channeled, and means for adjustably securing said bars to a seat or other structure to be secured.

2. A securing device of the class described comprising a pair of bars having inner ends slidably and pivotally connected, and having channeled outer ends, and means slidably carried by each bar for securing a seat or other member to be secured.

3. A securing device of the class described comprising a pair of bars having inner ends slidably and pivotally connected, and having their outer ends channeled to seat the side bar portions of a package carrier, the intermediate portions of the bars being longitudinally slotted, and means slidably held in said slots for securing a seat member, whereby said seat member may be clamped on a package carrier and the bars of said package carrier may be clamped with respect to the channels of the bars of the securing device.

In testimony that I claim the foregoing I have hereunto set my hand at Sheboygan, in the county of Sheboygan and State of Wisconsin, in the presence of two witnesses.

EWALD F. PAWSAT.

Witnesses:
 WM. H. GRUBE,
 ELEANOR MAYER.

Copies of this patent may be obtained for five cents each, by addressing the "Commissioner of Patents, Washington, D. C."